(12) United States Patent
Raspotnik, Jr.

(10) Patent No.: US 11,501,533 B2
(45) Date of Patent: *Nov. 15, 2022

(54) MEDIA AUTHENTICATION USING DISTRIBUTED LEDGER

(71) Applicant: Seagate Technology LLC, Fremont, CA (US)

(72) Inventor: William Barthel Raspotnik, Jr., Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/121,372

(22) Filed: Dec. 14, 2020

(65) Prior Publication Data

US 2021/0209373 A1    Jul. 8, 2021

Related U.S. Application Data

(63) Continuation of application No. 15/794,902, filed on Oct. 26, 2017, now Pat. No. 10,878,248.

(51) Int. Cl.
| | |
|---|---|
| *G06V 20/40* | (2022.01) |
| *G06F 21/16* | (2013.01) |
| *G06F 21/53* | (2013.01) |
| *H04L 9/32* | (2006.01) |
| *H04L 9/40* | (2022.01) |

(52) U.S. Cl.
CPC .............. *G06V 20/46* (2022.01); *G06F 21/16* (2013.01); *G06F 21/53* (2013.01); *H04L 9/32* (2013.01); *H04L 9/3236* (2013.01); *H04L 63/08* (2013.01); *G06F 2221/034* (2013.01); *H04L 2209/60* (2013.01)

(58) Field of Classification Search
CPC ..... G06K 9/00744; G06F 21/16; G06F 21/53; G06F 2221/034; G06F 21/64; H04L 9/32; H04L 9/3236; H04L 63/08; H04L 2209/60; H04L 2209/38; H04L 9/3239; H04L 9/3247; H04L 9/3297
See application file for complete search history.

(56) References Cited

U.S. PATENT DOCUMENTS

| | | | |
|---|---|---|---|
| 9,424,023 | B2 | 8/2016 | Janssen et al. |
| 9,960,920 | B2 | 5/2018 | Cuende et al. |
| 10,291,395 | B1 | 5/2019 | Nenov et al. |
| 10,754,323 | B2 | 8/2020 | Freer et al. |
| 10,755,230 | B2 | 8/2020 | Mehring et al. |

(Continued)

OTHER PUBLICATIONS

Author Unknown, "Implement your first IoT and Blockchain project," IBM, [retrieved on Aug. 22, 2017] 6 pages, retrieved from: https://www.ibm.com/internet-of-things/platform/private-blockchain/.

(Continued)

*Primary Examiner* — Girumsew Wendmagegn
(74) *Attorney, Agent, or Firm* — Holzer Patel Drennan

(57) ABSTRACT

The technology disclosed herein includes capturing a media content from a media recording device, generating a hash of the media content, storing the media content in a storage device, and transmitting a media transaction to a distributed ledger, the media transaction comprising the location of the media content in the storage device and the hash of the media content.

20 Claims, 5 Drawing Sheets

(56) References Cited

U.S. PATENT DOCUMENTS

| | | | |
|---|---|---|---|
| 10,855,758 B1 | 12/2020 | O'Connell et al. | |
| 10,878,248 B2* | 12/2020 | Raspotnik, Jr. | H04L 9/3239 |
| 10,972,282 B2 | 4/2021 | Banerjee et al. | |
| 11,012,228 B2 | 5/2021 | Mercuri et al. | |
| 11,037,082 B2 | 6/2021 | Scott | |
| 11,050,605 B2 | 6/2021 | Gulati | |
| 11,074,766 B2 | 7/2021 | Dietz et al. | |
| 11,128,528 B2 | 9/2021 | Nolan et al. | |
| 11,128,607 B2 | 9/2021 | Wright et al. | |
| 2006/0095923 A1 | 5/2006 | Novack | |
| 2010/0293345 A1 | 11/2010 | Sonnier | |
| 2013/0291001 A1 | 1/2013 | Besehanic | |
| 2016/0098730 A1 | 4/2016 | Feeney | |
| 2016/0275461 A1 | 9/2016 | Sprague | |
| 2016/0299918 A1 | 10/2016 | Ford | |
| 2016/0379212 A1 | 12/2016 | Bowman | |
| 2017/0134161 A1 | 5/2017 | Goeringer et al. | |
| 2017/0134162 A1* | 5/2017 | Code | H04L 9/3236 |
| 2017/0264428 A1 | 9/2017 | Seger, II | |
| 2017/0352027 A1 | 12/2017 | Zhang | |
| 2018/0121635 A1* | 5/2018 | Tormasov | H04L 9/3236 |
| 2018/0131765 A1 | 5/2018 | Puleston et al. | |
| 2018/0176228 A1 | 6/2018 | He | |
| 2018/0219676 A1 | 8/2018 | Mattingly et al. | |
| 2018/0248701 A1 | 8/2018 | Johnson | |
| 2018/0268386 A1 | 9/2018 | Wack | |
| 2018/0287797 A1 | 10/2018 | Banerjee | |
| 2019/0372755 A1 | 12/2019 | Tadie | |
| 2019/0372772 A1 | 12/2019 | Novotny et al. | |
| 2021/0126826 A1 | 4/2021 | Nolan et al. | |
| 2021/0185140 A1 | 6/2021 | Mild et al. | |
| 2021/0192650 A1 | 6/2021 | Hunn et al. | |
| 2021/0224358 A1 | 7/2021 | Lallin et al. | |
| 2021/0258150 A1 | 8/2021 | Moeller | |

OTHER PUBLICATIONS

O'Connor, Chris, "What blockchain means for you, and the Internet of Things," IBM, Feb. 10, 2017, [retrieved on Aug. 22, 2017] 9 pages, retrieved from: https://www.ibm.com/blogs/internet-of-things/watson-iot-blockchain/.

Reichert, Corrine, "Telstra explores blockchain, biometrics to secure smart home IoT devices," ZDNe,t Sep. 22, 2016 [retrieved on Aug. 22, 2017] 11 pages, retrieved from: http://www.zdnet.com/article/telstra-explores-blockchain-biometrics-to-secure-smart-home-iot-devices/.

No stated author; Hitachi Command Suite Audit Log Reference Guide; 2014; Retrieved from the Internet <URL: https://support.hitachivantara.com/download/epcra/hc2132.pdf>; pp. 1-480, as printed (Year: 2014).

No stated author; GoShredConfidential, Hard Drive 1 Data Destruction; May 2017; retrieved from web.archive, www.goshredconfidential.com/hard-drive-data-destruction/; pp. 1-4 as printed. (Year: 2017).

No stated author; Guardian Data Destruction; Apr. 2017; retrieved from web.archive, www.guardiandatadestruction.com/; pp. 1-16 as printed. (Year: 2017).

No stated author; Synetic technologies, On-site Data Destruction; Mar. 2016; retrieved from web.archive, https://synetictechnologies.com/solutions/ddv/; pp. 1-4, as printed. (Year: 2016).

* cited by examiner

MEDIA AUTHENTICATION USING DISTRIBUTED LEDGER

CROSS-REFERENCE TO RELATED APPLICATIONS

The present application is a continuation application of and claims priority of U.S. patent application Ser. No. 15/794,902 filed on Oct. 26, 2017 and entitled "MEDIA AUTHENTICATION USING DISTRIBUTED LEDGER," which is incorporated herein by reference in its entirety.

BACKGROUND

It is difficult to authenticate various information about media. For example, a user of a camera device may generate video output and then make various changes to the video output and it may not be easy to determine what portion of the video output is original and which is modified. Furthermore, once other users get access to the video output, they may make additional changes to not just the video output, but also to various metadata related to the video output.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, a technology disclosed herein includes capturing a media content from a media recording device, generating a hash of the media content, storing the media content in a storage device, and transmitting a media transaction to a distributed ledger, the media transaction comprising the location of the media content in the storage device and the hash of the media content.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Implementations described herein provide system for using distributed ledger to authenticate media files. Specifically, various implementations disclose using distributed ledger to document and authenticate video files. In one implementation, a media generating device, such as a camera, a smartphone, etc., includes a hash generator that generates a hash of the media content generated by the media generating device. The hash generator may also include the time of the media generation and the location of the media generation into the hash. Furthermore, the media may be stored on a storage media, such as a flash memory on the media generating device, magnetic storage media on the storage device, etc., and the hash generator may also include the location where the media is stored, such as the logical block address (LBA) on the magnetic storage media, block address on the flash memory, etc., into the hash of the media.

In one implementation, the hash generator is configured to automatically generates a hash anytime a portion of the media is recorded in any storage media. For example, a camera may be configured to store a video file in a number of pieces of video files, with each piece including a five second worth of media. In such an implementation, whenever such piece of media is stored, the hash generator generates a hash corresponding to the stored piece of media. A transmitter may communicate the hash to a distributed ledger. In one implementation, the transmitter is configured to transmit each hash file upon its creation. Alternatively, the transmitter may be configured to accumulate a predetermined number of hash files and communicate them to the distributed ledger.

An example of the distributed ledger is blockchain. Specifically, a blockchain is a decentralized and distributed digital ledger that is used to record transactions across many computers so that the record cannot be altered retroactively without the alteration of all subsequent blocks and the collusion of the network. This allows the participants to verify and audit transactions inexpensively. Thus, the distributed ledger provides a rich documentation and authentication about various attributes of the media.

Figure 1:
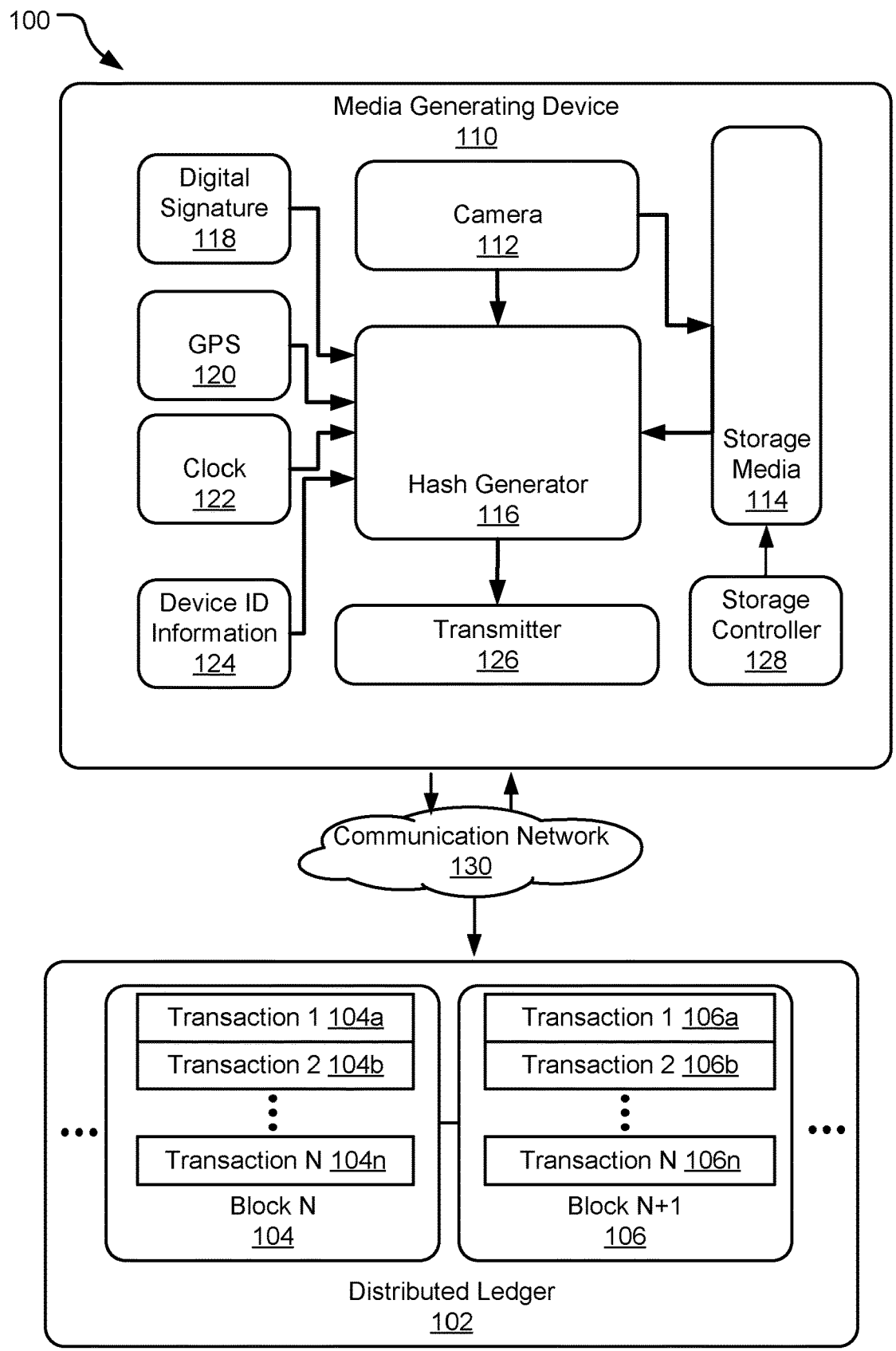
FIG. 1 illustrates an example block diagram of a media authentication system using an example distributed ledger.

FIG. 1 illustrates an example block diagram 100 of a system using an example distributed ledger 102 to authenticate media generated by a media generating device 110. Specifically, FIG. 1 illustrates the block diagram 100 of a media generating device 110 as generates media and stores a hash of the media with the distributed ledger 102. The distributed ledger 102 is utilized to track the various media generated by the media generating device 110. The distributed ledger 102 stores an immutable history of transactions including attestation transactions, media origination transactions, etc., for the media generated by the media generating device 110.

The distributed ledger 102 documents various transactions involving different media files generated by the media generating device 110. In FIG. 1, the distributed ledger 102 is a blockchain, but it should be understood that the distributed ledger 102 may configured in a different format, such as a directed acyclic graph, a chain of transactions, etc. In the illustrated implementation, the distributed ledger 102 includes a number of blocks that include a number of validated transactions related to the media. A block N 104 includes transaction 1 to transaction N and a block N+1 106 includes transaction 1 to transaction N. The blocks (e.g., the block N 104 and the block N+1 106) may include other data and metadata, such a previous hash, a nonce, a Merkle root, date, time node software version, etc.

The distributed ledger 102 is supported by a number of different "nodes." Nodes are computer systems executing processor executable instructions for supporting the distributed ledger 102. In some example implementations, nodes may be implemented in various types. For example, a full ledger node is a node that stores a substantially complete copy of the distributed ledger 102. A validation node is a node that may validate and approve transactions and/or blocks for inclusion in the distributed ledger 102. A contributor node is a node that contributes transactions for validation on the distributed ledger 102. A consumer node is a node that may consume and verify transactions on the distributed ledger 102. It should be understood that other types of nodes are contemplated.

The distributed ledger 102 may be implemented as a private (permissioned) ledger, a hybrid private/public ledger, or a fully public ledger. A private ledger is a ledger where each node supporting the ledger is authenticated or authorized to use the ledger. Furthermore, a private ledger may not be publicly visible or accessible by some nodes or outside parties. In a public distributed ledger, the full distributed ledger 102 is distributed publicly to many nodes and is accessible to all nodes in the network. Each node supporting the ledger includes a cryptographic identity, which may comprise a public/private key pair.

Different types of media transactions may be transmitted to, approved by, and stored in the distributed ledger 102. A media attestation transaction includes information that attests to authenticity, integrity, location, generation time, storage location, etc., of a specific media file generated by the media generating device 110. Media transactions sent to the distributed ledger may include information such as date and time of media generation, media describing characteristics, media generation location, identification of the media generating device 110, certificates (e.g., keys), etc.

In FIG. 1, the media generating device 110 includes a camera 112 that generates audio or video files. For example, the camera 112 may generate a photograph or a movie. A storage media 114 may be used to store the media generated by the camera 112. In one implementation, the storage media 114 may be a magnetic media, such as a conventional media recording (CMR) disc drive, a shingled media recording (SMR) disc drive, etc. In such an implementation, portions of media generated by the camera 112 may be stored at specific locations that may be identified by their logical block addresses (LBAs) where the LBAs are related to physical block addresses (PBAs). Alternatively, the media 114 may be flash media, in which case the locations where the media generated by the camera is stored may be identified by the LBAs that refer to block and page addresses on the flash.

In one implementation, the media generating device 110 also includes a geographical positioning system (GPS) module 120 that is configured to communicate with a GPS satellite to determine the location of the media generating device 110. Furthermore, a clock 122 located on the media generating device 110 may provide timing signals as well as timing information to various components of the media generating device 110. For example, the clock 122 may generate a time-stamp when a media is generated by the camera 112. Alternatively, the time-clock 122 may also be used to provide a time-stamp at the time the media generated by the camera 112 is saved in the storage media 114.

The media generating device 110 also includes device identification information 124 that stores identification information about the media generating device 110, such as a serial number of the media generating device 110, a network identification number of the media generating device 110, information identifying the owner of the media generating device 110, etc. Alternatively, the device identification information 124 also stores an internet protocol (IP) address of the media generating device 110, a media access control (MAC) address of the media generating device 110, a service set identifier (SSID) of the media generating device 110, an international mobile equipment identity (IMEI) of the media generating device 110, a software element identification (SEID) of the media generating device 110, etc. In one implementation, such device identification information 124 may be stored together with any media generated by the camera 112.

The media generating device 110 also includes a hash generator 116 that is configured to generate a hash of the media generated by the camera 112. The hash generator 116 may be implemented as processor executable instructions stored in memory of a computing machine (e.g., the media generating device 110 includes a memory storing instructions for the hash generator 116) and executed by a processor located on the media generating device 110.

In one implementation, the hash generator 116 generates hash of portions of media, where the size of the media portions may be determined based on the various parameters related to the media generating device 110. For example, in one implementation, the hash generator 116 generates a hash of a media portion when such media portion is stored on the storage media 114. Thus, if the media generating device 110 is configured to store media portions of 2 KB to the storage media 114, the hash generator 116 generates hash of media portions of 2 KB. In such an implementation, the when a media portion is communicated from the camera 112 to the storage media 114 for storage, the same media portion is also communicated from the camera 112 to the hash generator 116. Alternatively, the hash generator 116 may be configured to receive a signal from the camera 112 when a media portion is stored on the storage media 114 and the hash generator 116 may read that media portion from the storage media 114 upon receiving such signal.

In an alternative implementation, the hash generator 116 may generate a hash value of a media portion different than the size of media portions as they are saved on the storage media 114. For example, the hash generator 116 may combine a predetermined number of 2 KB media as they are stored on the storage media 114 and generate a hash of, for example, 100 of such 2 KB media portions.

The hash generator 116 may generate hash values (also referred to as hash codes) of the media portions using a hash function. In one implementation, the hash function used by the hash generator 116 may be a cryptographic hash function that allows one to easily verify that a given input data maps to a given hash value. Thus, the hash value generated by hash generator 116 may be mapped to an input media portion. However, in such a case, if the input value of the media portion is not known, a user is unable to reconstruct it by knowing the hash value output by the hash generator 116. Alternatively, the hash function may be collision-resistant in that the hash value generated by such a hash function may not be generated by any input data other than the media portion used to generate it.

In an alternative implementation, the media generator 116 generates the hash value using a combination of the values received from various other components of the media generating device 110. Thus, for example, the hash generator 116 uses the GPS location received from the GPS module 120, the time-stamp received from the clock 122, the device identification information 124, and a storage location of the media portion in the storage media 114 together with the media portion to generate the hash value. Alternatively, the hash generator 116 generates a header based on the GPS location received from the GPS module 120, the time-stamp received from the clock 122, the device identification information 124, and the storage location of the media portion in the storage media 114. Such header value may also be encrypted.

The hash generator 116 communicates with a transmitter 126 to communicate the hash value to the distributed ledger 102. In one implementation, the hash generator 116 communicates the hash values as they are generated. Alternatively, the hah generator 116 may accumulate a predetermined number of hash values and communicate the accumulated chunks of the hash values to the distributed ledger 102 at predetermined time intervals. If the hash generator 116 is configured to generate headers using various parameters of the media generating device 110 related to the media portions, such headers are also communicated with the hash values to the distributed ledger 102.

The distributed ledger 102 stores the hash values and/or the related header values as transactions on the blocks 104, 106 of the distributed ledger 102. In implementation, the transactions 104*a*, 104*b*, 104*n*, are signed by a private key of the ledger node of the media generating device 110. The other nodes supporting the distributed ledger 102 may verify the transactions based on a public key associated with the private key of the media generating device 110. Alternatively, the transactions 104*a*, 104*b*, 104*n* may also include the public key associated with the private key of the media generating device 110.

Because the hash values of the media portions are recorded to the distributed ledger, the authenticity of the media portions may be verified by third parties using the public key associated with the private key of the media generating device 110. For example, if the media portion has been sent by an owner of the media generating device 110 to a media publisher (such as Youtube, etc.), the media publisher may verify the authenticity and ownership of the media using the public key associated with the private key of the media generating device 110. Alternatively, if the media portion submitted by the owner of the media generating device 110 to a media publisher is compromised, the media publisher is not able to verify the authenticity based on the hash values recorded as transactions on the distributed ledger 102. In such a situation, the media publisher may notify the owner of the media generating device 110 or take any other corrective action as necessary.

Figure 2:
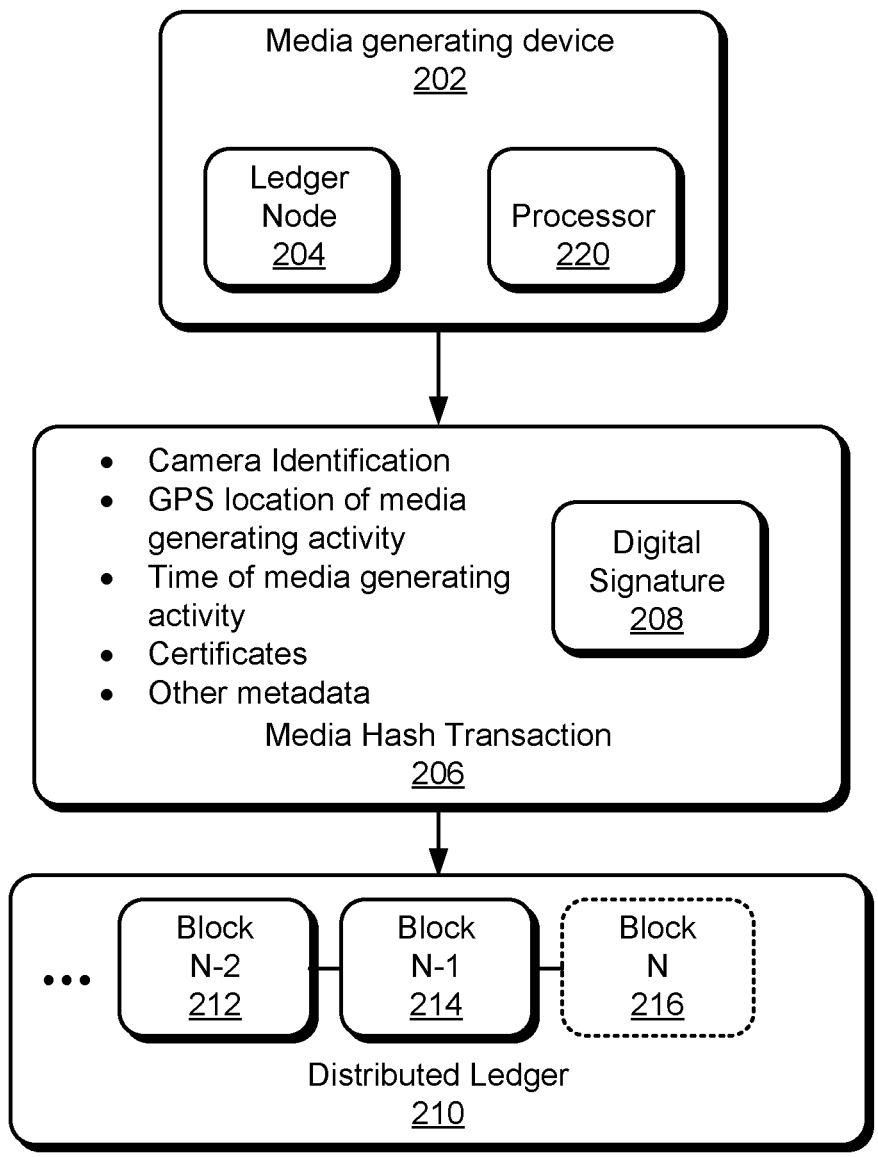
FIG. 2 illustrates a block diagram of an example hash value transaction being recorded to an example distributed ledger.

FIG. 2 illustrates a block diagram 200 of an example hash value transaction being recorded to an example distributed ledger. The block diagram 200 includes a media generating device 202 executing a ledger node 204. The media generating device 202 is illustrated as executing the storage node itself using a processor 220 located on the media generating device 202. Alternatively, a host connected to the media generating device 202 and separate from it may also be used to execute the ledger node 204.

The ledger node 204 may be implemented as processor executable instructions stored in memory of the media generating device 202 (e.g., the media generating device 202 includes a memory storing instructions for the ledger node 204) and executed by the processor 220 of the media generating device 202. The ledger node 204 is configured to consume transactions from the distributed ledger 310 and transmit transactions to the distributed ledger 210. In some example implementations, the ledger node 204 verifies transactions on the distributed ledger 210. Also in some example implementations, the ledger node 204 validates and approves transactions and/or blocks for inclusion in the distributed ledger 210. Furthermore, in some example implementations, the ledger node 204 stores a full or substantially full copy of the distributed ledger 210. The ledger node 204 is communicatively connected to the distributed ledger 210 (e.g., other nodes of the ledger) via a communication network (not shown). The communication network may include wired and/or wireless networks and include various communication network components for facilitating communications and transactions between nodes and devices.

In FIG. 2, the ledger node 204 of the media generating device 202 is transmitting a transaction 206 (hereinafter the "media hash transaction 206") to the distributed ledger 210. The media hash transaction 206 includes, for example, without limitation, media generating device identification (e.g., serial number or key), GPS location of the media generating activity, the time of the media generating activity, one or more certificates, and other metadata. The media generating device identification may be a serial number of the media generating device 202. The camera identification may also include a public key component of a public private key pair associated with the identity of the media generating device 202 or the ledger node 204.

The media hash transaction 206 further includes a digital signature 208, which signs the media hash transaction 206. In some example implementation, the media hash transaction 206 is signed by the private key of the transaction originator (e.g., the ledger node 204 of the media generating device 202). As such, the digital signature 208 is used to verify that the media hash was transmitted from an authorized entity (e.g., based on the public key associated with the private key).

The distributed ledger 210, which is supported by the ledger node 204 and other nodes not pictured in FIG. 2, includes a plurality of blocks, each with a number of transactions. The distributed ledger 210 includes a block N−1 212 and a block N−2 214. The block N−1 214 is the most recent block added to the distributed ledger 210. In other words, the block N−1 214 is the most recently validated and approved for the distributed ledger 210. The blocks are "chained" because each subsequent block includes a hash of the previous block. For example, the block N−1 214 includes a hash of the previous block, the block N−2 212, etc. A block N 216 is the next block in the distributed ledger 210. The block N has not been validated yet. The media hash transaction 206, if approved/validated, may be included in the block N once it is included in the distributed ledger 210.

Figure 3:
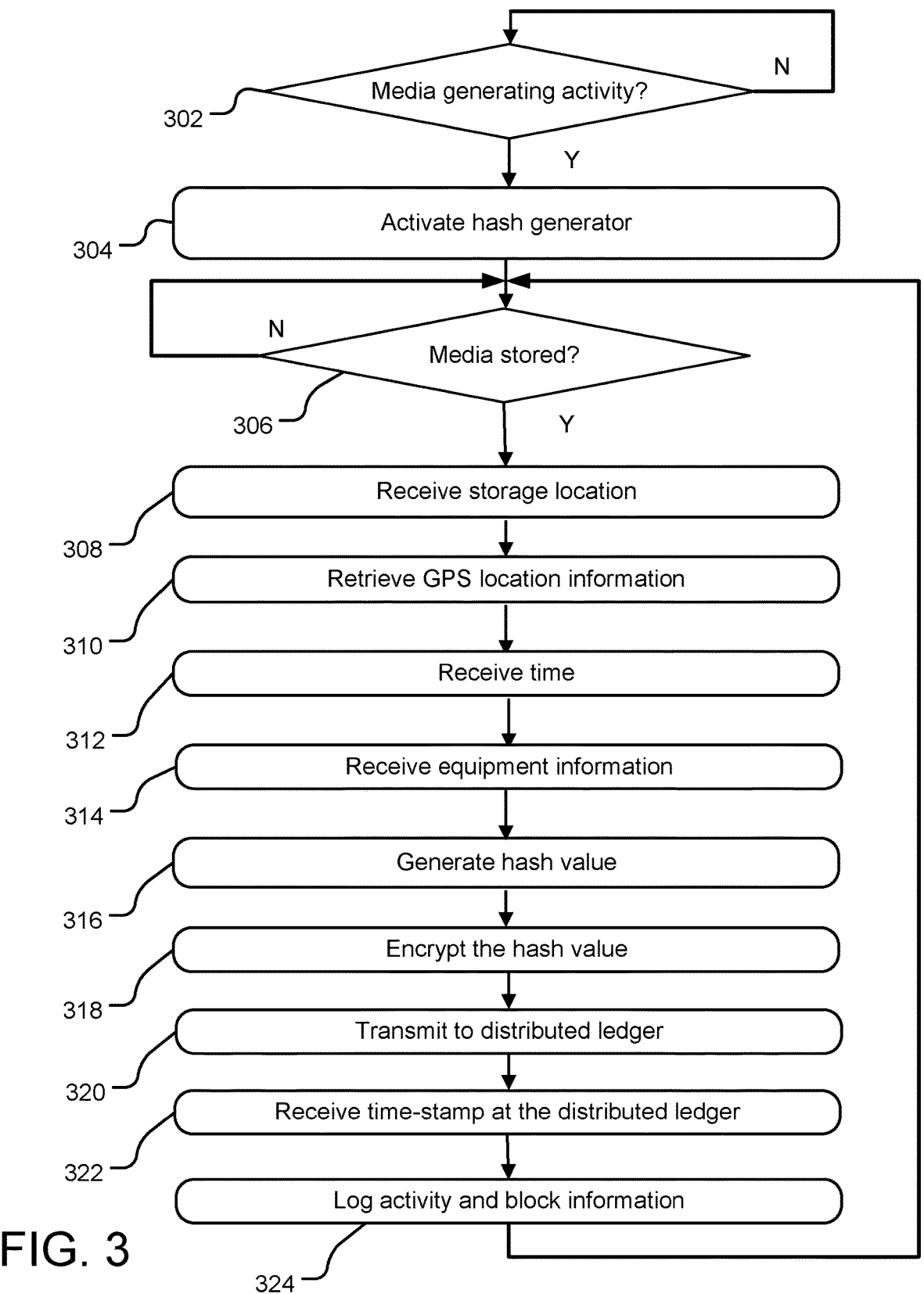
FIG. 3 illustrates example operations for utilizing an example distributed ledger described herein to store media hash on a distributed ledger.

FIG. 3 illustrates example operations 300 for utilizing an example distributed ledger described herein to store media hash on a distributed ledger. One or more of the operations 300 may be implemented using a processor on a media generating device (such as the media generating device 110 illustrated in FIG. 1). An operation 304 determines if any media generating activity has occurred. For example, a camera may communicate a signal to the processor when it is recording media. If so, an operation 304 activates a has generator. The hash generator may be software implemented or firmware implemented. For example, the hash generator (such as the hash generator 116 disclosed in FIG. 1).

An operation 306 determines if any media generated by the media generating device is stored in any storage media. In response to determining of such storage operation, an operation 308 receives the location of the storage. For example, operation 308 may receive the LBA of the storage media where the media is stored. An operation 310 may receive GPS location of the media generating device when the media is generated.

An operation 312 receives information about the time when the media was generated. For example, a time-stamp of the time when the media is generated may be communicated by a clock and received by the receiving operation 310. An operation 314 receives identification information about the media generating device, such as the serial number, network identification, an IP address, an IMEI, and SEID, an SSID, a MAC address, etc., and other metadata.

An operation 316 generates a hash value of the media stored on the storage media. In one implementation, the operation 316 generates a hash value of each media portion as it is stored on the storage media. However, in an alternative implementation, the operation 316 may generate hash value of a group of media portions. In one implementation, the operation 316 may use a cryptographic hash function that allows one to easily verify that a given input data maps to a given hash value. Alternatively, the operation 316 may use a hash function that is collision-resistant.

In one implementation, the operation 316 also uses the information received at one or more of the receiving operations 308-314 in generating the hash value. In other words, in such an implementation, the operation 316 uses the media portion together with the GPS information, the time-stamp, the identification information, etc., for generating the hash value. Alternatively, the information received at one or more of the receiving operations 308-314 may be used to generate a header that is separate from the hash value. An operation 318 encrypts the hash value and/or the combination of the hash value and the header. The encrypted output of operation 318 is communicated to a distributed ledger at operation 320. An operation 322 receives time-stamp of when the encrypted output of operation 318 is received at the distributed ledger. Subsequently, an operation 324 logs the information about the hash generation and transmission activity, together with the block on the distributed ledger where the hash value may be stored, and the time-stamp when the encrypted output of operation 318 is received at the distributed ledger. Logging the time-stamp when the hash value together with the metadata about the media allows for independent verification of the time when the media was generated. For example, the time received at the operation 312 may be compared with the time-stamp received at operation 322 to determine the veracity of the time of media generation.

Figure 4:
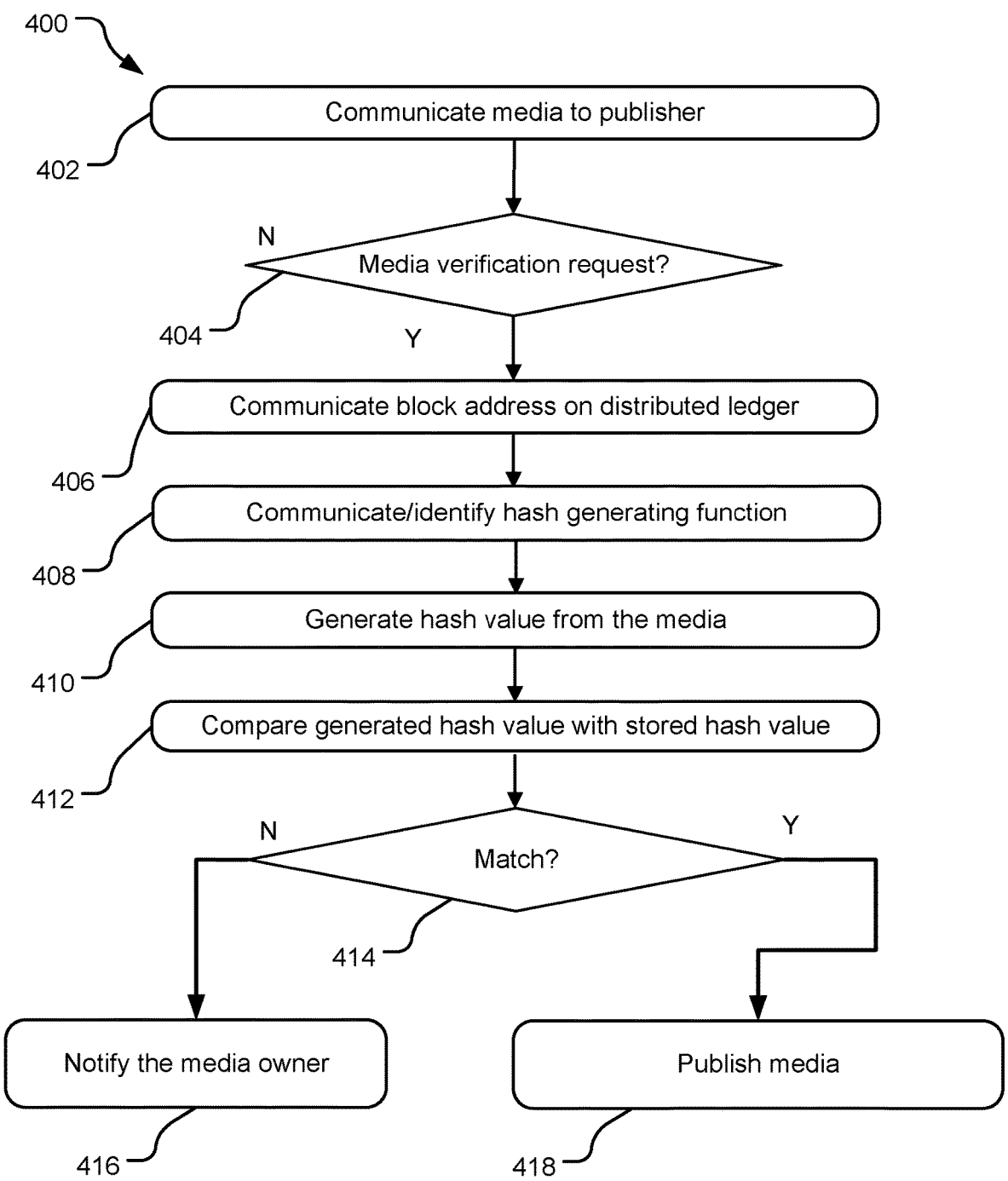
FIG. 4 illustrates example operations for utilizing an example distributed ledger described herein to authenticate media.

FIG. 4 illustrates example operations 400 for utilizing an example distributed ledger described herein to authenticate media. Specifically, one or more of the operations 400 may be implemented to allow a third party, such as a media publisher, to authenticate various media files. For example, the operations 400 may be performed in the process of publishing a video file on website of an on-line video publisher, on an online blog, etc.

An operation 402 communicates a media file to be published to a media publisher. For example, operation 402 may communicate a home-based video file of a to video file publisher for publishing it online. An operation 404 determines if a media verification request has been received. Specifically, the online publisher may send a request to the media recording device or the owner of the media recording device to verify the authenticity of the home-based video file.

In response to such a request from the publisher, an operation 406 communicates the block address on the distributed ledger where the hash value of the home-based video file is stored. As the distributed ledger is publicly available, the publisher is able to gather such hash value from such block. An operation 408 communicates or identifies the hash generating function to the media publisher. The hash generating function may be the function that is used to generate the hash value based on the home-based video file. Thus, the media publisher should be able to use the hash generating function to generate the hash value of the home-based video file. An operation 410 generates such hash value of the home-based video file.

An operation 412 compares the newly generated hash value by the media publisher with the hash value stored on the identified block of the distributed ledger. A determining operation 414 determines if they both match with each other. If there is no match, an operation 416 notifies the owner of the media file of the problem in verifying the authenticity of the media file. However, if there is a match, an operation 418 publishes the media.

Figure 5:
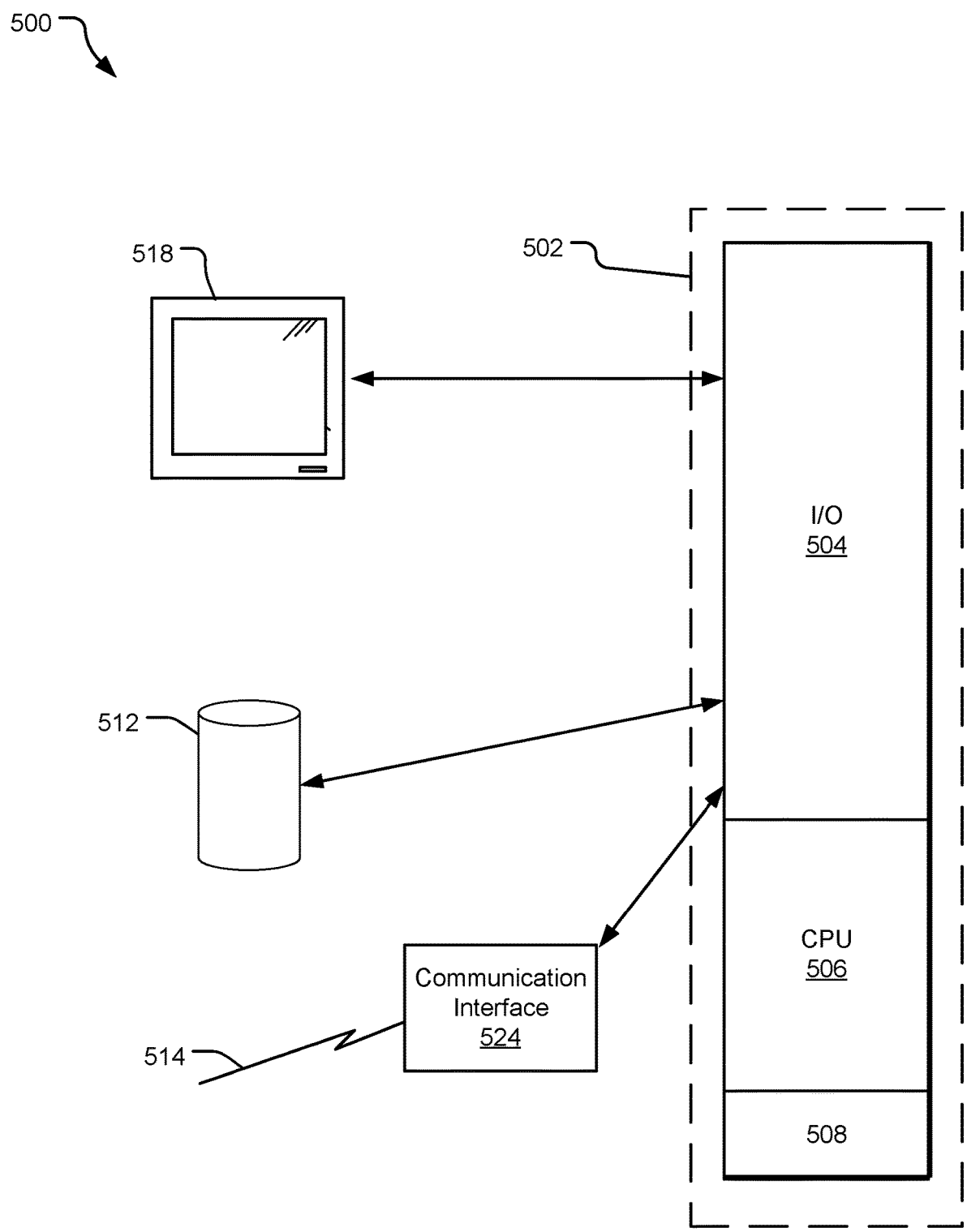
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave.

When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   capturing a media content from a media recording device;
   generating a hash of the media content;
   storing the media content in a storage device;
   transmitting a media transaction to a distributed ledger, the media transaction comprising LBA of storage location of the media content in the storage device and the hash of the media content; and
   verifying authenticity of the media content using an identification of a block address of the media transaction stored on the distributed ledger and identification of a hash function used to generate the hash of the media content to the media publisher.

2. The method of claim 1, further comprising storing the media transaction on the distributed ledger.

3. The method of claim 1, wherein generating a hash of the media content further comprising generating the hash of a combination of the media content and location of the media recording device at the time of capturing the media content.

4. The method of claim 1, wherein generating a hash of the media content in real time further comprising generating the hash of a combination of the media content and an identification of the media recording device at the time of capturing the media content.

5. The method of claim 1, wherein generating a hash of the media content in real time further comprising generating the hash of a combination of the media content and time of capturing the media content.

6. The method of claim 1 wherein generating a hash of the media content in real time further comprising generating the hash of a combination of the media content and LBA range of the location of recording the media content on the storage device.

7. The method of claim 1, wherein the media transaction further comprises a time-stamp indicating time of media content generation.

8. The method of claim 1, wherein generating the hash of the media content further comprises generating hash of the media content substantially at the time of generation of the media content.

9. The method of claim 1 wherein the media transaction further comprises an indication of an identity of an owner of a device used to generate the media content.

10. One or more non-transitory processor-readable storage media encoding processor-executable instructions for executing on a computer system a computer process, the computer process comprising:
   generating a media content using a media recording device;
   generating a hash of a media content generated by a media recording device;
   transmitting a media transaction to a distributed ledger, the media transaction comprising LBA of a storage location of the media content in the storage device and the hash of the media content; and
   in response to a verification request from a media publisher, communicating an identification of a block address of the media transaction stored on distributed ledger and identification of the hash function used to generate the hash of the media content to the media publisher.

11. The one or more non-transitory processor-readable storage media of claim 10 wherein the computer process further comprising storing the media transaction on the distributed ledger.

12. The one or more non-transitory processor-readable storage media of claim 10, wherein generating a hash of the media content further comprising generating the hash of a combination of the media content and an identification of the media recording device at the time of capturing the media content.

13. The one or more non-transitory processor-readable storage media of claim 10, further comprising receiving the verification request from the media publisher.

14. The one or more non-transitory processor-readable storage media of claim 10, wherein generating the hash of the media content further comprises generating hash of the media content substantially at the time of generation of the media content.

15. The one or more non-transitory processor-readable storage media of claim 10, wherein generating the hash of the media content further comprises generating hash of the media content substantially at the time of storing of the media content in the storage device.

16. A system comprising:
   one or more processors;
   a memory; and
   a ledger node stored in the memory and executable by the one or more processors to support a distributed ledger, the ledger node configured to:
   generate a hash of a media content generated by a media recording device;
   generate a media transaction comprising LBA of storage location of the media content in the storage device and the hash of the media content; and
   support verification of the media content by communicating the storage location of the media transaction on a distributed ledger to a media publisher in response to a media content verification request.

17. The system of claim 16 wherein the ledger node is further configured to generate the media transaction including location of the media recording device at the time of capturing the media content.

18. The system of claim 17 wherein the ledger node is further configured to generate the media transaction including identification of the media recording device.

19. The system of claim 16, wherein the location of recording the media content on the storage device is a GPS location of the media generating device when the media is generated and the location of the media content in the storage device is a storage location of the media content in a storage media.

20. The system of claim 19, wherein the location of the media content in the storage device is identified by at least one of logical block addresses (LBAs) related to physical block addresses (PBAs) of the location of the media content and LBAs related to block and page addresses of the media content on a flash.

* * * * *